(12) United States Patent
Recio, III et al.

(10) Patent No.: US 11,377,587 B2
(45) Date of Patent: Jul. 5, 2022

(54) TREATMENT FLUIDS FOR DEMULSIFYING PRODUCTION FLUIDS

(71) Applicant: Halliburton Energy Services, Inc., Houston, TX (US)

(72) Inventors: Antonio Recio, III, Humble, TX (US); Kristina Henkel Holan, Cypress, TX (US); Paul Ashcraft, Cypress, TX (US); Denise Nicole Benoit, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/280,147

(22) PCT Filed: Nov. 21, 2018

(86) PCT No.: PCT/US2018/062305
§ 371 (c)(1),
(2) Date: Mar. 25, 2021

(87) PCT Pub. No.: WO2020/106296
PCT Pub. Date: May 28, 2020

(65) Prior Publication Data
US 2022/0002613 A1 Jan. 6, 2022

(51) Int. Cl.
*C09K 8/584* (2006.01)
*C09K 8/12* (2006.01)
*E21B 43/16* (2006.01)

(52) U.S. Cl.
CPC ............ *C09K 8/584* (2013.01); *C09K 8/12* (2013.01)

(58) Field of Classification Search
CPC ............ C09K 8/584; C09K 8/12; E21B 43/16
USPC ............................................ 166/305.1
See application file for complete search history.

(56) References Cited

U.S. PATENT DOCUMENTS

| 4,537,701 | A | * | 8/1985 | Oppenlaender | ............ | C08G 8/36 |
| | | | | | | 516/179 |
| 4,551,239 | A | * | 11/1985 | Merchant | ................ | C10G 33/04 |
| | | | | | | 208/187 |
| 6,294,093 | B1 | | 9/2001 | Selvarajan et al. | | |
| 6,555,009 | B2 | | 4/2003 | Varadaraj | | |

(Continued)

FOREIGN PATENT DOCUMENTS

| EP | 0222587 B1 | 9/1989 |
| WO | 2017099706 A1 | 6/2017 |

OTHER PUBLICATIONS (LOBA Chemie) MSDS Nonyl Phenol Ethyoxylated: p. 2, heading Substance; p. 4, heading information on basic physcial and chemical properties, Sep. 4, 2015.

(Continued)

*Primary Examiner* — Zakiya W Bates
*Assistant Examiner* — Ashish K Varma
(74) *Attorney, Agent, or Firm* — McGuireWoods LLP

(57) ABSTRACT

Treatment fluids and associated methods and systems for demulsifying an emulsified well fluid. An example method includes contacting the emulsified well fluid with a treatment fluid comprising: an aqueous base fluid; an alcohol; a resin alkoxylated oligomer; a polyol; and a polyamine polyether. The emulsified well fluid is separated into an aqueous phase and an oleaginous phase after contact with the treatment fluid.

20 Claims, 4 Drawing Sheets

(56) References Cited

U.S. PATENT DOCUMENTS

| | | | |
|---|---|---|---|
| 8,168,062 B2* | 5/2012 | McDaniel | C10G 33/04 |
| | | | 208/188 |
| 9,109,443 B2 | 8/2015 | Manrique et al. | |
| 9,260,545 B1* | 2/2016 | Squicciarini | C08F 220/56 |
| 2007/0111903 A1* | 5/2007 | Engel | C23F 11/122 |
| | | | 507/261 |
| 2017/0158968 A1 | 6/2017 | Bailey et al. | |

OTHER PUBLICATIONS (DOW) MSDS Carbowax Polyethylene Glycol (PEG) 600; Dec. 2011; p. 1, heading Typical Physical Properties.

(KMCO) SDS KB 1410; Oct. 2013; p. 6, Section 9; Physcial and Chemical Properties.

International Search Report and Written Opinion in PCT/US2018/062305, dated May 7, 2019.

* cited by examiner

TREATMENT FLUIDS FOR DEMULSIFYING PRODUCTION FLUIDS

TECHNICAL FIELD

The present disclosure relates generally to well production operations, and more particularly, to demulsifying production fluids to improve the phase separation of the production fluids.

BACKGROUND

The demulsification of oil-in-water or water-in-oil emulsions may be an important part of a variety of treatment operations. During production, crude oil may be produced and subsequently separated into its constituent components of oil and water.

The composition of the produced crude oil may vary from formation to formation based on a variety of factors. As such, some samples of produced crude oil may more easily form stable emulsions, making them more difficult to demulsify. Generally, the presence of surface-active components in the crude oil increases the potential of the crude oil to form and maintain stable emulsions. In particular, crude oil comprising high concentrations of asphaltene and/or naphthenic acid content (e.g., greater than 3%), crude oil with high densities (e.g., an API Gravity less than 36), and/or crude oil with a total acid number greater than 1.

Produced crude oil should be separated in an efficient manner to avoid losses in productivity. Some production operations can require the complete separation of the oil and water phases within 10 minutes at ambient temperature. As such, the efficiency of the demulsification process can be an important part of production. The present disclosure provides improved methods and compositions for demulsifying production fluids.

BRIEF DESCRIPTION OF THE DRAWINGS

Illustrative examples of the present disclosure are described in detail below with reference to the attached drawing figures, which are incorporated by reference herein, and wherein.

Figure 1:
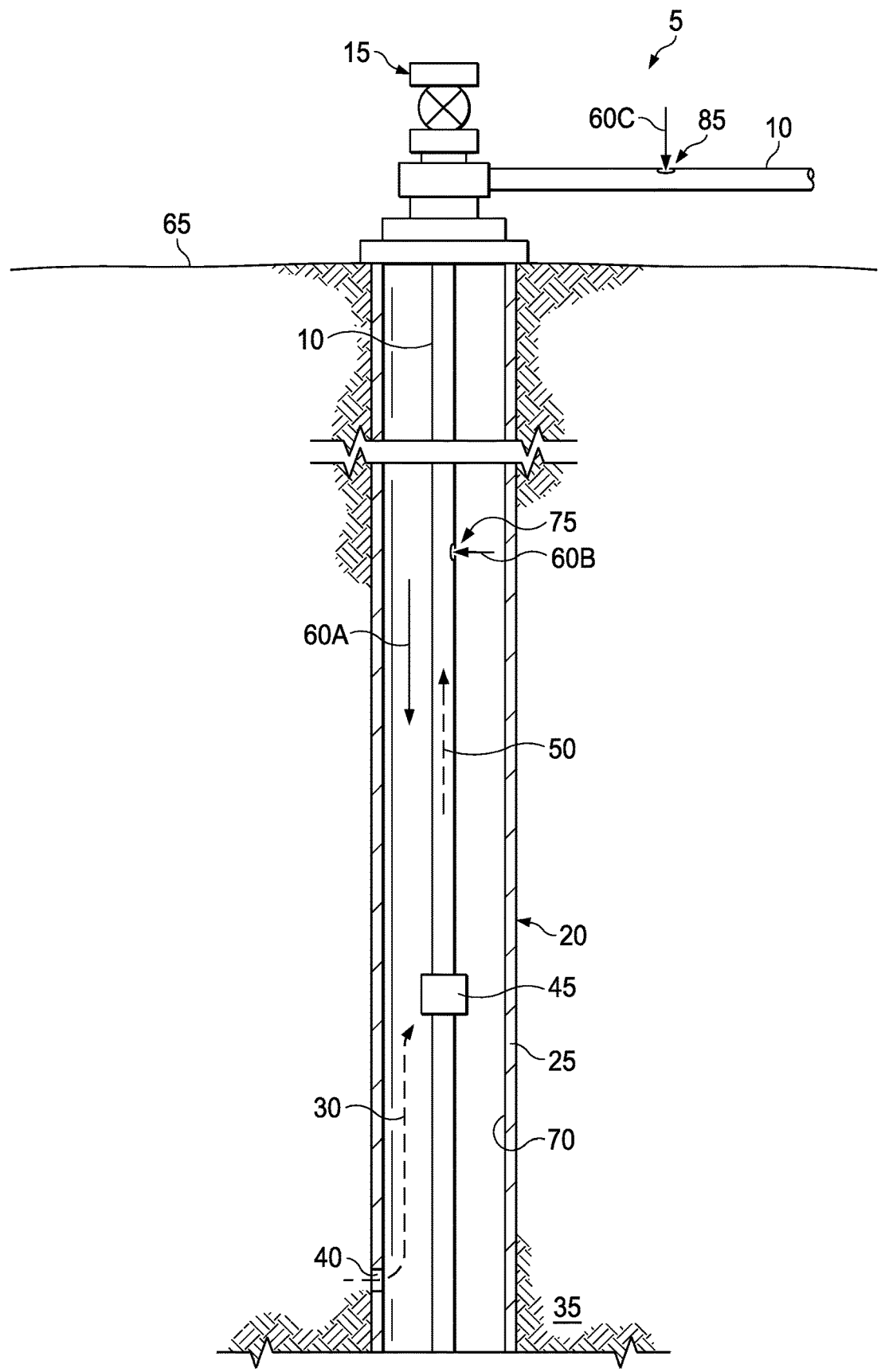
FIG. 1 is a schematic illustrating a production system in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to well production operations, and more particularly, to demulsifying production fluids to improve the phase separation of the production fluids.

In the following detailed description of several illustrative examples, reference is made to the accompanying drawings that form a part hereof, and in which is shown by way of illustration, examples that may be practiced. These examples are described in sufficient detail to enable those skilled in the art to practice them, and it is to be understood that other examples may be utilized and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present disclosure. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Unless otherwise specified, any use of any form of the terms "connect," "engage," "couple," "attach," or any other term describing an interaction between elements is not meant to limit the interaction to direct interaction between the elements and may also include indirect interaction between the elements described. Further, any use of any form of the terms "connect," "engage," "couple," "attach," or any other term describing an interaction between elements includes items integrally formed together without the aid of extraneous fasteners or joining devices. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The examples described herein relate to the use of a treatment fluid to demulsify production fluids. Advantageously, the treatment fluid utilizes a synergistic combination of a polyol and a polyamine polyether to improve the separation of the oil and water phases of production fluids that comprise high concentrations of asphaltene and/or naphthenic acid content (e.g., greater than 3%), high densities (e.g., an API Gravity less than 36), and/or have a total acid number greater than 0.5. An additional advantage is that the treatment fluids are free of non-alcoholic and non-aqueous solvents. As such, the treatment fluids may not comprise petroleum naphtha or light aromatic solvents that may have a deleterious environmental impact. Another advantage is that the treatment fluids may be free of nonylphenols, alkyl phenol ethoxylates, and bisphenol A.

FIG. 1 is a schematic illustrating a production system, generally 5, including production tubing 10 and a wellhead 15 disposed within a well 20. The well 20 may be an oil well, water well, etc. In some examples, the well 20 may be cased with a casing 25, for example, a cement sheath. In other examples, the well 20 may not be cased. Reservoir fluid 30 may enter the well 20 from a subterranean formation 35 via a casing perforation 40. In some examples, reservoir fluid 30 may already be present in the well 20 having previously entered from the subterranean formation 35. The reservoir fluid 30 may enter the production tubing 10 via entry point 45. Entry point 45 represents any entry point for the reservoir fluid 30 into the production tubing 10. Entry point 45 may be a pump intake for a submersible pump, an opening of an inflow control device, etc.

After reservoir fluid 30 enters production tubing 10 it may be produced as a production fluid 50 by being pumped uphole through the production tubing 10 to the wellhead 15. Reservoir fluid 30, and consequently production fluid 50, may comprise the constituent components of crude oil and water. In some instances, the crude oil and water may be emulsified. Before the crude oil can undergo further processing, it may need to be separated from the constituent water. If the crude oil and water are emulsified, demulsification may be necessary to separate the crude oil and water into their separate phases.

With continued reference to FIG. 1, a treatment fluid 60 may be used to demulsify the reservoir fluid 30 and/or the production fluid 50. The treatment fluid 60 may be introduced at any stage of the production process. Treatment fluid 60A is introduced into the well 20 from the surface 65 and pumped into the annulus 70 between the wall of the well 20 or corresponding casing 25 and the production tubing 10. Treatment fluid 60A may contact reservoir fluid 30 in the annulus 70 and initiate demulsification of reservoir fluid 30 prior to reservoir fluid 30 entering entry point 45. Treatment fluid 60A may also flow into the production tubing 10 via entry point 45 where it may continue to demulsify the reservoir fluid 30 as it is produced.

Alternatively, or in addition to treatment fluid 60A, treatment fluid 60B may be injected into the production tubing 10 downhole to initiate the demulsification of the production fluid 50 within the production tubing 10. Treatment fluid 60B may enter production tubing 10 via injection point 75 which may be any type of port or valve coupled to production tubing 10 as would be readily apparent to one of ordinary skill in the art. The treatment fluid 60B may be pumped from the surface 65 via a separate injection line (not illustrated) coupled to an exterior surface of the production tubing 10.

Alternatively, or in addition to treatment fluids 60A and 60B, treatment fluid 60C may be injected into the production tubing 10 via injection point 85 at the surface 65. Injection point 85 is disposed in the production tubing 10 at some point downstream of the wellhead 15. In some examples, treatment fluid 60C may be injected at the wellhead 15. Treatment fluid 60C may contact the production fluid 50 to initiate demulsification as the production fluid 50 is conveyed to a separator or further processing application via the post-wellhead 15 production tubing 10.

Figure 2:
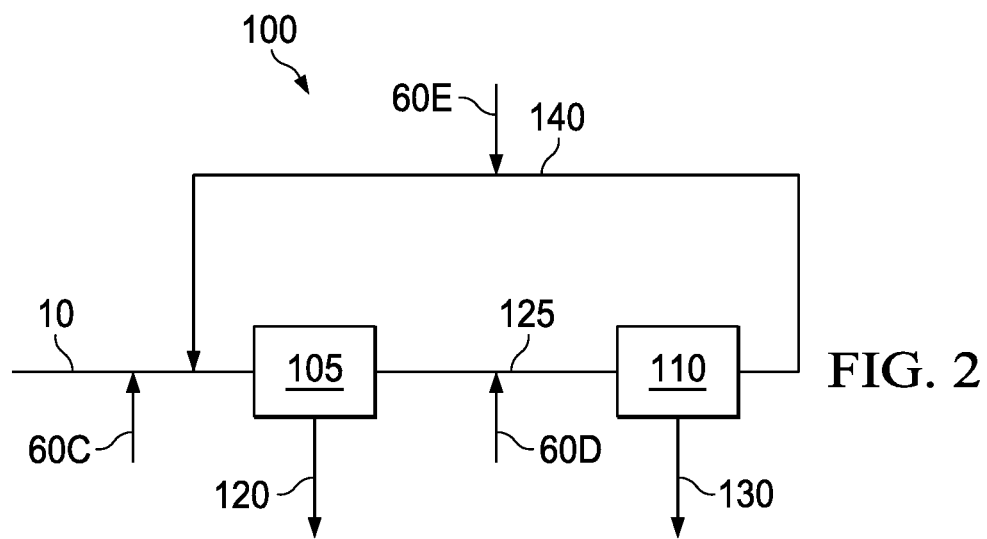
FIG. 2 is a schematic illustrating a separator system in accordance with one or more examples described herein.

FIG. 2 is a schematic illustrating a separator system, generally 100, including production tubing 10 and primary and secondary separators 105, 110. Production tubing 10 conveys the production fluid 50 (as illustrated in FIG. 1) to a separator 105. Prior to introduction into primary separator 105, the treatment fluid 60C may be introduced into the production tubing 10 to initiate the demulsification of the production fluid 50 as described above in FIG. 1.

The primary separator 105 may be any primary separator or separator process sufficient for separation of the production fluid 50 into its constituent crude oil and water phases. Examples of primary separator 105 may include, but are not limited to, a phase separator (two or three phase), a wash tank ("gun barrel" separator), a free water knockout separator, a heat treater, and the like. The primary separator 105 separates the production fluid 50 into crude oil and water. Treatment fluid 60 may assist the primary separator 105 with the phase separation of the production fluid 50 by breaking, destabilizing, and preventing the formation of emulsions within the production fluid 50. The oil phase is removed from the primary separator 105 and the separator system 100 via produced oil line 120. The separated water (i.e., the water phase of the production fluid 50) is conveyed to a secondary separator 110 via the separated water line 125.

In some alternative examples, multiple primary separators 105 may be used in series, for example, the production fluid 50 may be passed through multiple phase separators before being conveyed to the secondary separator 110.

Treatment fluid 60D may be injected into the separated water line 125 to aid in the demulsification of the produced water exiting primary separator 105. Treatment fluid 60D may be added instead of or in addition to any of treatment fluids 60A-C. The separated water may comprise small amounts of free or dissolved hydrocarbons and solids that may need to be removed before the water can be re-used, injected, and/or discharged. The secondary separator 110 is a separator or separation process that may be used to remove these small amounts of free or dissolved hydrocarbons and solids from the separated water. Examples of secondary separators may include, but should not be limited to, gravity separators such as skim tanks and plate coalescers, gas floatation units, deoiling hydrocyclones, centrifuges, and the like. The produced water is removed from the secondary separator 110 and the separator system 100 via produced water line 130. In some alternative examples, multiple secondary separators 110 may be used in series, for example, the separated water may be passed through multiple skim tanks before being conveyed to the produced water line 130. The remaining oil from the secondary separator 110 may be reinjected to the production tubing 10 via a recycled oil line 140. The recycled oil line 140 may convey the remaining oil to the production tubing 10 via an injection point disposed before the production fluid 50 enters the primary separator 105. This remaining oil may then reenter the separator system 100. Treatment fluid 60E may be injected into the recycled oil line 140 to treat the remaining oil and initiate or continue demulsification. Treatment fluid 60E may be added instead of or in addition to any of treatment fluids 60A-D.

It is to be understood that treatment fluid 60 may contact reservoir fluid 30 and/or production fluid 50 at any point of a well operation as would be readily understood by one of ordinary skill in the art. As such, the introduction of treatment fluid 60 into the production system 5 and the separator system 100 is not to be limited to the illustrated injection points for treatment fluids 60A-60E.

It should be clearly understood that the example production system 5 and separation system 100 illustrated by FIGS. 1 and 2 are merely general applications of the principles of this disclosure in practice, and a wide variety of other examples are possible. Therefore, the scope of this disclosure is not limited in any manner to the details of FIGS. 1 and 2 as described herein.

The treatment fluid (i.e. treatment fluid 60 illustrated in FIGS. 1 and 2) comprises a resin alkoxylated oligomer. Examples of the resin alkoxylated oligomer include, but are not limited to, phenol formaldehyde ethoxylates, alkoxylated alkyl phenol formaldehyde resins, epoxy resin alkoxylates, poly diepoxide ethoxylates, phenolic resins, methyloxirane polymers, phenol formaldehyde polymers with methyloxirane, phenol formaldehyde oxiranes, butyl resins, or any combinations thereof. In a preferred example, the resin alkoxylated oligomer is a phenol formaldehyde oxirane.

The concentration of the resin alkoxylated oligomer in the treatment fluid may range from about 0.002% (v/v) to about 80% (v/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the resin alkoxylated oligomer in the treatment fluid may range from about 0.002% (v/v) to about 80% (v/v), from about 0.005% (v/v) to about 80% (v/v), from about 0.01% (v/v) to about 80% (v/v), from about 0.05% (v/v) to about 80% (v/v), from about 0.1% (v/v) to about 80% (v/v), from about 0.5% (v/v) to about 80% (v/v), from about 1% (v/v) to about 80% (w/v), from about 5% (v/v) to about 80% (v/v), from about 10% (v/v) to about 80% (v/v), from about 15% (v/v) to about 80% (v/v), from about 20% (v/v) to about 80% (v/v), from about 25% (v/v) to about 80% (v/v), from about 30% (v/v) to about 80% (v/v), from about 35% (v/v) to about 80% (v/v), from about 40% (v/v) to about 80% (v/v), from about 45% (v/v) to about 80% (v/v), from about 50% (v/v) to about 80% (v/v), from about 55% (v/v) to about 80% (v/v), from about 60% (v/v) to about 80% (v/v), from about 65% (v/v) to about 80% (v/v), from about 70% (v/v) to about 80% (v/v), or from about 75% (v/v) to about 80% (v/v). As another example, the concentration of the resin alkoxylated oligomer in the treatment fluid may range from about 0.002% (v/v) to about 80% (v/v), from about 0.002% (v/v) to about 75% (w/v), from about 0.002% (v/v) to about 70% (v/v), from about 0.002% (v/v) to about 65% (v/v), from about 0.002% (v/v) to about 60% (v/v), from about 0.002% (v/v) to about 55% (v/v), from about 0.002% (v/v) to about 50% (v/v), from about 0.002% (v/v) to about 45% (v/v), from about 0.002% (v/v) to about 40% (v/v), from about 0.002% (v/v) to about 35% (v/v), from about 0.002% (v/v) to about 30% (v/v), from about 0.002% (v/v) to about 25% (v/v), from about 0.002% (v/v) to about 20% (v/v), from about 0.002% (v/v) to about 15% (v/v), from about 0.002% (v/v) to about 10% (v/v), from about 0.002% (v/v) to about 5% (v/v), from about 0.002% (v/v) to about 1% (v/v), from about 0.002% (v/v) to about 0.5% (v/v), from about 0.002% (v/v) to about 0.1% (v/v), from about 0.002% (v/v) to about 0.05% (v/v), from about 0.002% (v/v) to about 0.01% (v/v), or from about 0.002% (v/v) to about 0.005% (v/v). With the benefit of this disclosure, one of ordinary skill in the art will be readily able to prepare a treatment fluid having a sufficient concentration of resin alkoxylated oligomer for a given application.

The treatment fluid comprises a polyamine polyether. One example of a polyamine polyether has the structure:

A polyamine composition having the following structure:

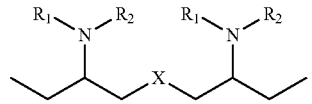

where $R_1$ and $R_2$ are any linear or branched: alkyl, alkenyl, vinyl, allyl, alkynyl, aryl, phenyl, benzyl, proparyl substituents and tethered $R_1$ and $R_2$ substituents. In addition, X is an oxyalkoxo group having the following structure:

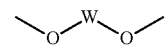

In which W is any functionality selected from the group of: C1 to C5 alkylene moiety, e.g.: 2-methyl propylene; 2,2-dimethyl propylene; and the like as illustrated below:

Other examples of polyamine polyethers are:

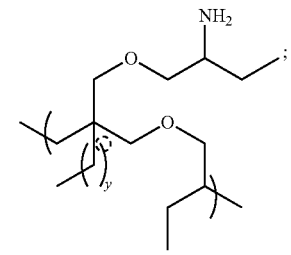

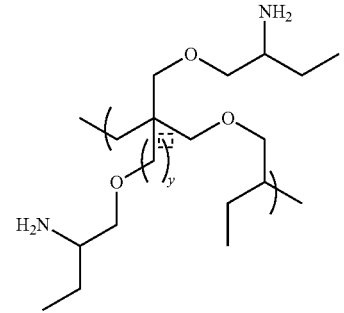

Including mixtures of the above polyamine structures in which y=0 to 6 methylene units. A still further example of the polyamine polyether is:

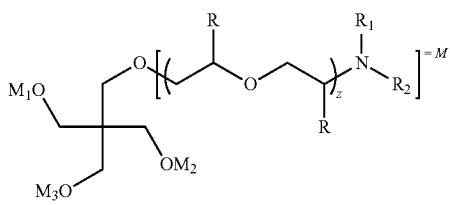

in which R=methyl, ethyl, propyl; R1 and R2 are any linear or branched: alkyl, alkenyl, vinyl, allyl, alkynyl, aryl, phenyl, benzyl, proparyl substituents and tethered R1 and R2 substituents. Z=1 to 250 repetitive units. M1 can=M, or any combination of the substituents (R, R1, R2) and lengths (Z) listed above. M2 can=M, or any combination of the substituents (R, R1, R2) and lengths (Z) listed above. M3 can=M, or any combination of the substituents (R, R1, R2) and lengths (Z) listed above.

Some other examples of the polyamine polyether include, but are not limited to, amine oxyalkylates, alkoxylated polyamines, amine-initiated polyol block copolymers, ethylenediamine ethoxylated polyethyleneimine polymers, ethylenediamine propoxylated polyethyleneimine polymers, and any combinations thereof. In a preferred example, the resin alkoxylated oligomer is an alkoxylated polyamine.

The concentration of the polyamine polyether in the treatment fluid may range from about 0.002% (v/v) to about 80% (v/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the polyamine polyether in the treatment fluid may range from about 0.002% (v/v) to about 80% (v/v), from about 0.005% (v/v) to about 80% (v/v), from about 0.01% (v/v) to about 80% (v/v), from about 0.05% (v/v) to about 80% (v/v), from about 0.1% (v/v) to about 80% (v/v), 0.5% (v/v) to about 80% (v/v), from about 1% (v/v) to about 80% (w/v), from about 5% (v/v) to about 80% (v/v), from about 10% (v/v) to about 80% (v/v), from about 15% (v/v) to about 80% (v/v), from about 20% (v/v) to about 80% (v/v), from about 25% (v/v) to about 80% (v/v), from about 30% (v/v) to about 80% (v/v), from about 35% (v/v) to about 80% (v/v), from about 40% (v/v) to about 80% (v/v), from about 45% (v/v) to about 80% (v/v), from about 50% (v/v) to about 80% (v/v), from about 55% (v/v) to about 80% (v/v), from about 60% (v/v) to about 80% (v/v), from about 65% (v/v) to about 80% (v/v), from about 70% (v/v) to about 80% (v/v), or from about 75% (v/v) to about 80% (v/v). As another example, the concentration of the polyamine polyether in the treatment fluid may range from about 0.002% (v/v) to about 80% (v/v), from about 0.002% (v/v) to about 75% (w/v), from about 0.002% (v/v) to about 70% (v/v), from about 0.002% (v/v) to about 65% (v/v), from about 0.002% (v/v) to about 60% (v/v), from about 0.002% (v/v) to about 55% (v/v), from about 0.002% (v/v) to about 50% (v/v), from about 0.002% (v/v) to about 45% (v/v), from about 0.002% (v/v) to about 40% (v/v), from about 0.002% (v/v) to about 35% (v/v), from about 0.002% (v/v) to about 30% (v/v), from about 0.002% (v/v) to about 25% (v/v), from about 0.002% (v/v) to about 20% (v/v), from about 0.002% (v/v) to about 15% (v/v), from about 0.002% (v/v) to about 10% (v/v), from about 0.002% (v/v) to about 5% (v/v), from about 0.002% (v/v) to about 1% (v/v), from about 0.002% (v/v) to about 0.5% (v/v), from about 0.002% (v/v) to about 0.1% (v/v), from about 0.002% (v/v) to about 0.05% (v/v), from about 0.002% (v/v) to about 0.01% (v/v), or from about 0.002% (v/v) to about 0.005% (v/v)). With the benefit of this disclosure, one of ordinary skill in the art will be readily able to prepare a treatment fluid having a sufficient concentration of polyamine polyether for a given application.

The treatment fluid comprises a polyol. An example polyol comprises the structure:

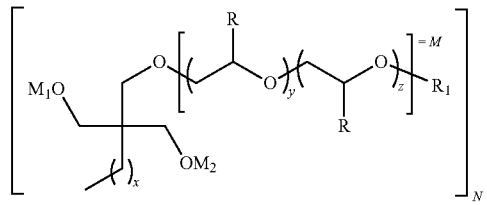

where N is the molecular weight of the polyol between 5,000 and 15,000; X=0 to 6 methylene units; Y=ethylene (R=H) ranging from 80% to 0% of the molecular weight; or Y=propylene (R=Methyl) ranging from 60% to 0% of the molecular weight; Z=ethylene (R=H) ranging from 80% to 0% of the molecular weight; or Z=propylene (R=Methyl) ranging from 60% to 0% of the molecular weight; R1=hydrogen, alkyl, alkenyl, alkynyl, aryl substituted; M=y+x≥90% of the desired polyol molecular weight; M1 can=M, or any combination of % ethylene or propylene units (y, z) in order to meet the molecular weight requirement; and M2 can=M, or any combination of % ethylene or propylene units (y, z) in order to meet the molecular weight requirement. A specific example of the polyol comprises X=0, Y=ethylene (R=H)=35%, Z=propylene (R=CH3)=50%, R1=CH3, and M=M1=M2=85% ethylene oxide, propylene oxide combination.

Other examples of the polyol include, but are not limited to, polyoxyalkylene glycol, a polyol block copolymer, and any combinations thereof. In a preferred example, the polyol is polyoxyalkylene glycol.

The concentration of the polyol in the treatment fluid may range from about 0.002% (v/v) to about 80% (v/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the polyol in the treatment fluid may range from about 0.002% (v/v) to about 80% (v/v), from about 0.005% (v/v) to about 80% (v/v), from about 0.01% (v/v) to about 80% (v/v), from about 0.05% (v/v) to about 80% (v/v), from about 0.1% (v/v) to about 80% (v/v), from about 0.5% (v/v) to about 80% (v/v), from about 1% (v/v) to about 80% (w/v), from about 5% (v/v) to about 80% (v/v), from about 10% (v/v) to about 80% (v/v), from about 15% (v/v) to about 80% (v/v), from about 20% (v/v) to about 80% (v/v), from about 25% (v/v) to about 80% (v/v), from about 30% (v/v) to about 80% (v/v), from about 35% (v/v) to about 80% (v/v), from about 40% (v/v) to about 80% (v/v), from about 45% (v/v) to about 80% (v/v), from about 50% (v/v) to about 80% (v/v), from about 55% (v/v) to about 80% (v/v), from about 60% (v/v) to about 80% (v/v), from about 65% (v/v) to about 80% (v/v), from about 70% (v/v) to about 80% (v/v), or from about 75% (v/v) to about 80% (v/v). As another example, the concentration of the polyol in the treatment fluid may range from about 0.002% (v/v) to about 80% (v/v), from about 0.002% (v/v) to about 75% (w/v), from about 0.002% (v/v) to about 70% (v/v), from about 0.002% (v/v) to about 65% (v/v), from about 0.002% (v/v) to about 60% (v/v), from about 0.002% (v/v) to about 55% (v/v), from about 0.002% (v/v) to about 50% (v/v), from about 0.002% (v/v) to about 45% (v/v), from about 0.002% (v/v) to about 40% (v/v), from about 0.002% (v/v) to about 35% (v/v), from about 0.002% (v/v) to about 30% (v/v), from about 0.002% (v/v) to about 25% (v/v), from about 0.002% (v/v) to about 20% (v/v), from about 0.002% (v/v) to about 15% (v/v), from about 0.002% (v/v) to about 10% (v/v), from about 0.002% (v/v) to about 5% (v/v), from about 0.002% (v/v) to about 1% (v/v), from about 0.002% (v/v) to about 0.5% (v/v), from about 0.002% (v/v) to about 0.1% (v/v), from about 0.002% (v/v) to about 0.05% (v/v), from about 0.002% (v/v) to about 0.01% (v/v), or from about 0.002% (v/v) to about 0.005% (v/v). With the benefit of this disclosure, one of ordinary skill in the art will be readily able to prepare a treatment fluid having a sufficient concentration of polyol for a given application.

The treatment fluid comprises an alcohol sufficient for use as a solvent for the other components of the treatment fluid. Examples of the alcohol include, but are not limited to, n-propanol, isopropanol, n-butanol, 2-butanol, n-pentanol, methanol, ethanol, neopentyl alcohol, isodecyl alcohol, isotridecyl alcohol, allyl alcohol, crotyl alcohol, 3-Buten-2-ol, 2-Methyl-2-propen-1-ol, propargyl alcohol, cyclic-secondary alcohols and any combinations thereof. In a preferred example, the alcohol is isopropanol.

The concentration of the alcohol in the treatment fluid may range from about 0.002% (v/v) to about 50% (v/v). The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the alcohol in the treatment fluid may range from about 0.002% (v/v) to about 50% (v/v), from about 0.005% (v/v) to about 50% (v/v), from about 0.01% (v/v) to about 50% (v/v), from about 0.05% (v/v) to about 50% (v/v), from about 0.1% (v/v) to about 50% (v/v), from about 0.5% (v/v) to about 50% (v/v), from about 1% (v/v) to about 50% (w/v), from about 5% (v/v) to about 50% (v/v), from about 10% (v/v) to about 50% (v/v), from about 15% (v/v) to about 50% (v/v), from about 20% (v/v) to about 50% (v/v), from about 25% (v/v) to about 50% (v/v), from about 30% (v/v) to about 50% (v/v), from about 35% (v/v) to about 50% (v/v), from about 40% (v/v) to about 50% (v/v), or from about 45% (v/v) to about 50% (v/v). As another example, the concentration of the alcohol in the treatment fluid may range from about 0.002% (v/v) to about 50% (v/v), from about 0.002% (v/v) to about 45% (v/v), from about 0.002% (v/v) to about 40% (v/v), from about 0.002% (v/v) to about 35% (v/v), from about 0.002% (v/v) to about 30% (v/v), from about 0.002% (v/v) to about 25% (v/v), from about 0.002% (v/v) to about 20% (v/v), from about 0.002% (v/v) to about 15% (v/v), from about 0.002% (v/v) to about 10% (v/v), from about 0.002% (v/v) to about 5% (v/v), from about 0.002% (v/v) to about 1% (v/v), from about 0.002% (v/v) to about 0.5% (v/v), from about 0.002% (v/v) to about 0.1% (v/v), from about 0.002% (v/v) to about 0.05% (v/v), from about 0.002% (v/v) to about 0.01% (v/v), or from about 0.002% (v/v) to about 0.005% (v/v). With the benefit of this disclosure, one of ordinary skill in the art will be readily able to prepare a treatment fluid having a sufficient concentration of alcohol for a given application.

The treatment fluids described herein comprise an aqueous base fluid, for example, freshwater, saltwater (e.g., water containing one or more salts dissolved therein), brine (e.g., saturated saltwater, including saturated saltwater produced from subterranean formations), seawater, or any combination thereof. Generally, the aqueous base fluid may be from any source provided that the aqueous base fluid does not contain an excess of compounds that may undesirably affect other components in the treatment fluid. In the case of brines, the aqueous base fluid may comprise a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like. One of ordinary skill in the art, with the benefit of this disclosure, should be readily able to select an aqueous base fluid for a chosen application.

The concentration of the aqueous base fluid in the treatment fluid may range from about 0.002% (w/v) to about 80% (w/v). The concentration of the aqueous base fluid in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the aqueous base fluid in the treatment fluid may range from about 0.002% (w/v) to about 80% (w/v), from about 0.005% (w/v) to about 80% (w/v), from about 0.01% (w/v) to about 80% (w/v), from about 0.05% (w/v) to about 80% (w/v), from about 0.1% (w/v) to about 80% (w/v), from about 0.5% (w/v) to about 80% (w/v), from about 1% (w/v) to about 80% (w/v), from about 5% (w/v) to about 80% (w/v), from about 10% (w/v) to about 80% (w/v), from about 15% (w/v) to about 80% (w/v), from about 20% (w/v) to about 80% (w/v), from about 25% (w/v) to about 80% (w/v), from about 30% (w/v) to about 80% (w/v), from about 35% (w/v) to about 80% (w/v), from about 40% (w/v) to about 80% (w/v), from about 45% (w/v) to about 80% (w/v), from about 55% (w/v) to about 80% (w/v), from about 60% (w/v) to about 80% (w/v), from about 65% (w/v) to about 80% (w/v), from about 70% (w/v) to about 80% (w/v), or from about 75% (w/v) to about 80% (w/v). As another example, the concentration of the aqueous base fluid in the treatment fluid may range from about 0.002% (w/v) to about 80% (w/v), from about 0.002% (w/v) to about 75% (w/v), from about 0.002% (w/v) to about 70% (w/v), from about 0.002% (w/v) to about 65% (w/v), from about 0.002% (w/v) to about 60% (w/v), from about 0.002% (w/v) to about 55% (w/v), from about 0.002% (w/v) to about 50% (w/v), from about 0.002% (w/v) to about 45% (w/v), from about 0.002% (w/v) to about 40% (w/v), from about 0.002% (w/v) to about 35% (w/v), from about 0.002% (w/v) to about 30% (w/v), from about 0.002% (w/v) to about 25% (w/v), from about 0.002% (w/v) to about 20% (w/v), from about 0.002% (w/v) to about 15% (w/v), from about 0.002%

(w/v) to about 10% (w/v), from about 0.002% (w/v) to about 5% (w/v), from about 0.002% (w/v) to about 1% (w/v), from about 0.002% (w/v) to about 0.5% (w/v), from about 0.002% (w/v) to about 0.1% (w/v), from about 0.002% (w/v) to about 0.05% (w/v), from about 0.002% (w/v) to about 0.01% (w/v), or from about 0.002% (w/v) to about 0.005% (w/v). With the benefit of this disclosure, one of ordinary skill in the art will be able to prepare a treatment fluid having an aqueous base fluid for a given application.

As discussed above, in some examples, the treatment fluid may not comprise any non-alcoholic solvents and/or any non-aqueous solvents or non-aqueous base fluids. Examples of these excluded solvents and base fluids may include, but are not limited to, aromatic solvents such as toluene, xylene, etc.; aromatic petroleum naphtha such as heavy aromatic petroleum naphtha (CAS No. 64742-94-5), light aromatic petroleum naphtha (CAS No. 64742-95-6), etc.; branched and linear dibasic ethers such as dimethyl 2-methylglutarate; trimethyl citrate; turpentine; terpenes such as ethyl lactate, d-limonene, dipentene, citrus, orange, etc.; caster oil ethoxylates; 9-decenoate methyl ester; propylene glycol propyl ether; propylene glycol butyl ether; N-methyl-pyrrolidone; N-octyl-2-pyrrolidinone; 1-dodecyl-2-pyrrolidinone; N,N-dimethyl-9-decenamide; acetic ester of monoglycerides; diethyl carbonate; hydrocarbon distillates (C7-C28); or any combinations thereof.

In some examples, the treatment fluid does not comprise nonylphenol ethoxylates, alkyl phenol ethoxylates, and/or bisphenol A.

In some optional examples, the treatment fluid may further comprise a pH adjustor. The pH adjustor may be any chemical agent sufficient for adjusting the pH of the treatment fluid to a desired range without negatively impacting the functionality of the other treatment fluid components. In some examples, the preferred pH range of the treatment fluid is about 4 to about 12. General examples of the pH adjustor include, but are not limited to, any hydroxide or metal hydroxide, borates, metallated-formate, metallated-acetate, metallated organic acetate, metallated-carbonate, metallated-carbamate, metallated-alkylcarbamate, metallated-phosphate, metallated-phosphonate, metallated-sulfate, metallated-sulfonate, ammonium hydroxide, alkyl ammonium hydroxide, or any combinations thereof. A preferred example of the pH adjustor is ammonium hydroxide.

In some optional examples, the treatment fluid may further comprise a pH control agent (e.g., a buffer) such as carbonate or bicarbonate to prevent rapid changes in pH. In some examples, the treatment fluid does not comprise a pH control agent. Examples of pH control agents include, but are not limited to, phosphate, dihydrogen phosphate, monohydrogen phosphate, sulfate and bisulfate, sulfite and bisulfite, boric acid, borate salts and polyborate species (e.g., perborate, metaborate, pentaborate, tetraborate, diborate, $B[OH]_4^-$, $B_2[OH]_5^-$, $B_2[OH]_7^-$, $BO_2^-$, $B_4O_7^{2-}$, $B_2O_3$, $[BO_2]_2$, $BO_4^-$, $B_4O_5(OH)_4^{2-}$, $B_3O_3(OH)_4^-$, $B_5O_6(OH)_4^-$, $B_2O(OH)_5^{3-}$, $B_2[OH]_7^-$; etc.), non-stoichiometric borates (e.g., ulexite mineral), or any combinations thereof.

In some optional examples, the treatment fluid may further comprise an additive. The additive may be used to adjust a property of the treatment fluid, for example, viscosity, density, etc. Examples of the additives include, but are not limited to, silica scale control additives, corrosion inhibitors, surfactants, gel stabilizers, anti-oxidants, polymer degradation prevention additives, relative permeability modifiers, scale inhibitors, foaming agents, defoaming agents, antifoaming agents, iron control agents, particulate diverters, salts, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art and the benefit of this disclosure will be able to formulate a treatment fluid having properties suitable for a desired application.

In some examples, the treatment fluid may be used to contact and demulsify reservoir fluids and/or production fluids having API densities less than 36. In some examples, the treatment fluid may be used to contact and demulsify reservoir fluids and/or production fluids having asphaltene content greater than 3%. In some examples, the treatment fluid may be used to contact and demulsify reservoir fluids and/or production fluids having naphthenic acid content greater than 3%. In some examples, the treatment fluid may be used to contact and demulsify reservoir fluids and/or production fluids having a total acid number greater than 0.5.

EXAMPLES

The present disclosure may be better understood by reference to the following examples, which are offered by way of illustration. The present disclosure is not limited to the examples provided herein.

Example 1

This initial example involved two crude oil samples that typically result in stabilize water-in-oil emulsions. Saturate, aromatic, resin and asphaltene analsyis (hereafter "SARA), paraffin analysis, and total acid number analysis (hereafter "TAN") was performed on each of the samples. The results of these analyses are illustrated by Table 1:

TABLE 1

| Crude Oil Analysis | | | | | | | |
|---|---|---|---|---|---|---|---|
| Crude Oil Source | API Gravity | Saturates Area % | Aromatics Area % | Resins Area % | Asphaltenes Area % | TAN mg KOH/g | Paraffins Wt. % |
| Gulf of Mexico | 32.3 | 32.9 | 44 | 15.6 | 7.5 | 1.22 | 7.2 |
| South America | 26.28 | 26.7 | 51.9 | 14 | 7.3 | 4.2 | 6.7 |

Each sample had an API gravity less than 36, an asphaltene content greater than 3%, and a TAN greater than 0.5. These findings suggest that the samples may have a high concentration of surface-active components that efficiently stabilize water and crude oil emulsions.

Example 2

Figure 3:
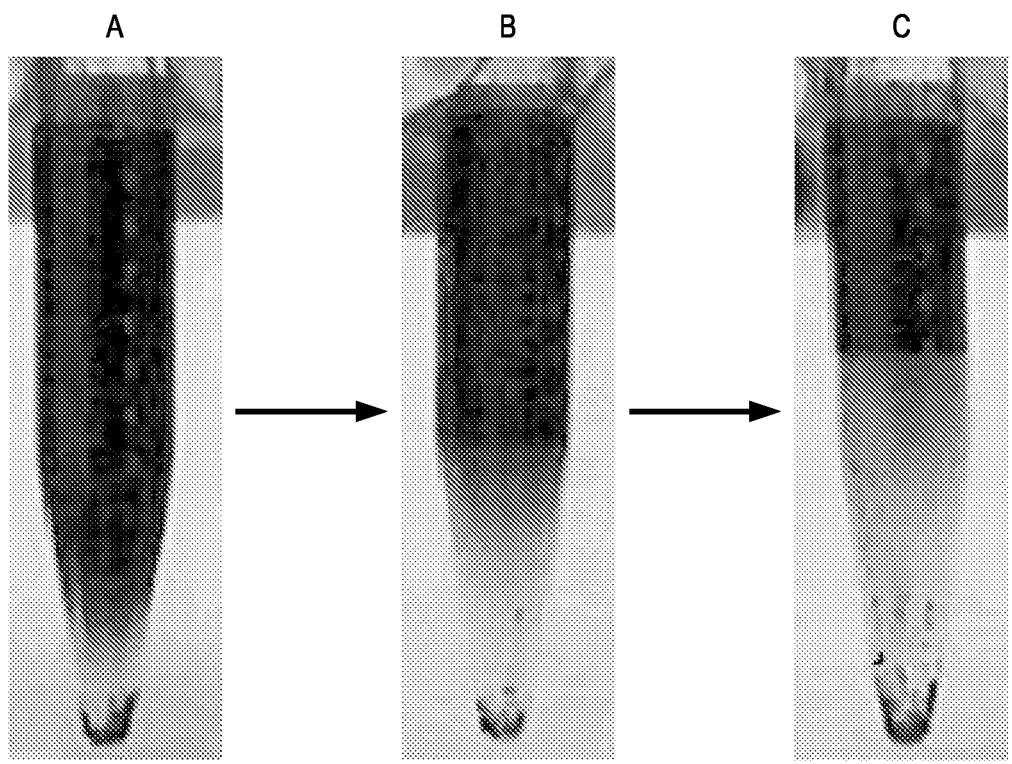
FIG. 3 is a photograph illustrating a comparison of treatment fluid components in accordance with one or more examples described herein.

An experiment was performed on the South American sample to demulsify it. The results are illustrated by the photo of FIG. 3. An alcohol and an aqueous base fluid were added to all samples. Sample A illustrates the South American sample without treatment. Sample B illustrates the South American sample after the addition of a blend of resin alkoxylated oligomers. Sample C illustrates the South American sample after the addition of the blend of resin alkoxylated oligomers used in Sample B, as well as the addition of a polyol. These results indicate that the addition of the blend of resin alkoxylated oligomers resulted in some separation, and that this effect was increased by the further addition of the polyol. However, no sample was completely separated by the ten-minute mark at ambient temperature. The ten-minute duration is frequently used in industry as the standard time frame for emulsion breaking of crude oil samples.

Example 3

Figure 4:
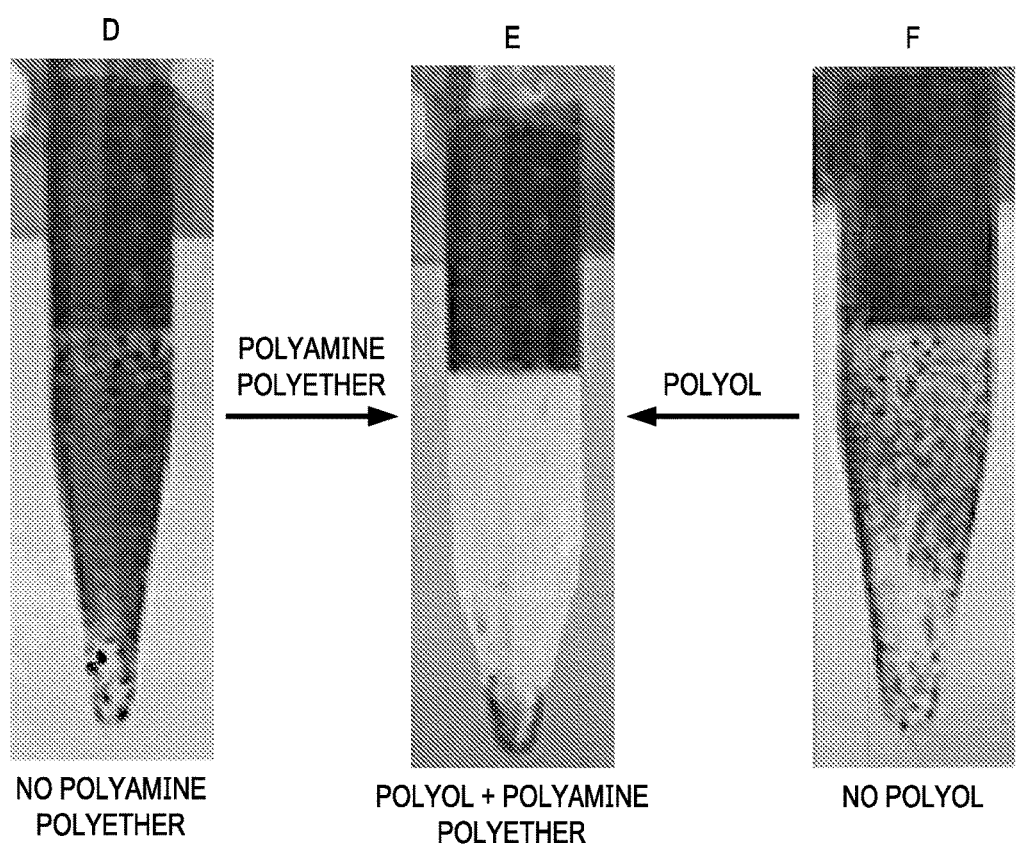
FIG. 4 is a photograph illustrating a comparison of treatment fluid components in accordance with one or more examples described herein.

An experiment was performed on the Gulf of Mexico sample to demulsify it. The results are illustrated by the photo of FIG. 4. For this example, an alcohol, an aqueous base fluid, and a blend of resin alkoxylated oligomers were added to all samples. Sample D illustrates the Gulf of Mexico sample with only the blend of resin alkoxylated oligomers and a polyol. Sample F illustrates the Gulf of Mexico sample with only the blend of resin alkoxylated oligomers and a polyamine polyether. Sample E illustrates the Gulf of Mexico sample with the blend of resin alkoxylated oligomers, a polyol, and a polyamine polyether. The addition of the blend of resin alkoxylated oligomers and either the polyol or the polyamine polyether did not result in complete separation at the ten-minute mark at ambient temperature. However, the addition of a polyol and a polyamine polyether did result in the complete separation of the water and oil phases by the ten-minute mark at ambient temperature. These results illustrate the synergistic effect of adding both a polyol and a polyamine polyether to these specific compositions of crude oil that are very efficient at stabilizing emulsions.

Example 4

Figure 5:
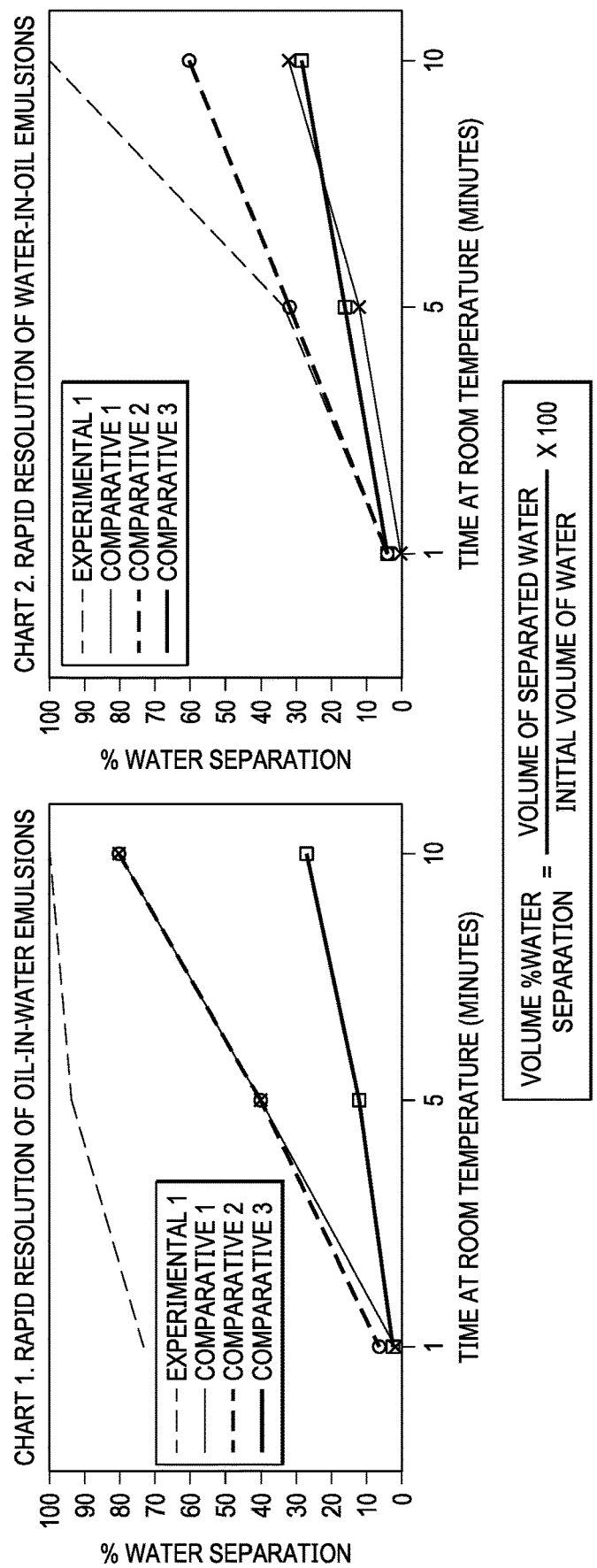
FIG. 5 is an illustration of two graphs comparing an experimental treatment fluid formulation to commercial formulations in accordance with one or more examples described herein.

Additional experiments were performed on the Gulf of Mexico sample to compare the effectiveness of the combination of a polyol and polyamine polyether against commercial demulsifiers used in the field. The results are illustrated by the charts of FIG. 5. Experimental 1 is a treatment fluid formulation as described herein and comprised an aqueous base fluid, an alcohol, a blend of resin alkoxylated oligomers, a polyamine polyether, and a polyol. Comparatives 1-3 are commercial samples used for comparative purposes. Chart 1 illustrates use in oil-in-water emulsions. Chart 2 illustrates use in water-in-oil emulsions. The percent water separation was compared over time and measured at the one, five, and ten-minute intervals. The percent water separation is calculated as shown in Equation 1:

$$Vol\ \%\ \text{Water Separation} = \frac{\text{Volume of Separated Water}}{\text{Initial Volume of Water}} \times 100 \quad \text{(Eq. 1)}$$

These results indicate that Experimental 1 was the only formulation to reach complete separation of the oil and water phases by the ten-minute mark at room temperature. This result was achieved for both oil-in-water and water-in-oil emulsions.

It is also to be recognized that the disclosed treatment fluids may directly or indirectly affect the various downhole equipment and tools that may contact the treatment fluids disclosed herein. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the methods and systems generally described above and depicted in FIGS. 1-2.

Provided are methods of demulsifying an emulsified well fluid in accordance with the disclosure and the illustrated FIGs. An example method comprises contacting the emulsified well fluid with a treatment fluid comprising: an aqueous base fluid; an alcohol; a resin alkoxylated oligomer; a polyol; and a polyamine polyether; The emulsified well fluid is separated into an aqueous phase and an oleaginous phase after contact with the treatment fluid.

Additionally or alternatively, the method may include one or more of the following features individually or in combination. The resin alkoxylated oligomer may comprise a resin alkoxylated oligomer selected from the group consisting of phenol formaldehyde ethoxylates, alkoxylated alkyl phenol formaldehyde resins, epoxy resin alkoxylates, poly diepoxide ethoxylates, phenolic resins, methyloxirane polymers, phenol formaldehyde polymers with methyloxirane, phenol formaldehyde oxiranes, butyl resins, and any combinations thereof. The polyol may be selected from the group consisting of polyoxyalkylene glycol, a polyol block copolymer, and any combinations thereof. The polyamine polyether may be selected from the group consisting of amine oxyalkylates, alkoxylated polyamines, amine-initiated polyol block copolymers, ethylenediamine ethoxylated polyethyleneimine polymers, ethylenediamine propoxylated polyethyleneimine polymers, and any combination thereof. The treatment fluid may not comprise at least one of nonylphenol ethoxylates, alkyl phenol ethoxylates, and bisphenol A. The treatment fluid may not comprise aromatic solvents, toluene, xylene, aromatic petroleum naphtha, light aromatic petroleum naphtha, branched dibasic ethers, linear dibasic ethers, dimethyl 2-methylglutarate, trimethyl citrate, turpentine, terpenes, ethyl lactate, d-limonene, dipentene, citrus, orange, caster oil ethoxylates, 9-decenoate methyl ester, propylene glycol propyl ether, propylene glycol butyl ether, N-methyl-pyrrolidone, N-octyl-2-pyrrolidinone, 1-dodecyl-2-pyrrolidinone, N,N-dimethyl-9-decenamide, acetic ester of monoglycerides, diethyl carbonate, hydrocarbon distillates (C7-C28), or any combinations thereof. The emulsified well fluid may have a property selected from the group consisting of asphaltene content greater than 3%, naphthenic acid content greater than 3%, API gravity less than 36, total acid number greater than 0.5, and any combination thereof. The concentration of the resin alkoxylated oligomer may be in a range of about 0.002% (v/v) to about 80% (v/v) of the treatment fluid. The concentration of the polyol may be in a range of about 0.002% (v/v) to about 80% (v/v) of the treatment fluid. The concentration of the polyamine polyether may be in a range of about 0.002% (v/v) to about 80% (v/v) of the treatment fluid. The emulsified well fluid may be separated into the aqueous phase and the oleaginous phase after contact with the treatment fluid for ten minutes or less.

Provided are treatment fluids for demulsifying an emulsified well fluid in accordance with the disclosure and the illustrated FIGs. An example treatment fluid comprises an aqueous base fluid; an alcohol; a resin alkoxylated oligomer; a polyol; and a polyamine polyether.

Additionally or alternatively, the treatment fluid may include one or more of the following features individually or in combination. The resin alkoxylated oligomer may comprise a resin alkoxylated oligomer selected from the group consisting of phenol formaldehyde ethoxylates, alkoxylated alkyl phenol formaldehyde resins, epoxy resin alkoxylates, poly diepoxide ethoxylates, phenolic resins, methyloxirane polymers, phenol formaldehyde polymers with methyloxirane, phenol formaldehyde oxiranes, butyl resins, and any combinations thereof. The polyol may be selected from the group consisting of polyoxyalkylene glycol, a polyol block copolymer, and any combinations thereof. The polyamine polyether may be selected from the group consisting of amine oxyalkylates, alkoxylated polyamines, amine-initiated polyol block copolymers, ethylenediamine ethoxylated polyethyleneimine polymers, ethylenediamine propoxylated polyethyleneimine polymers, and any combination thereof. The treatment fluid may not comprise at least one of nonylphenol ethoxylates, alkyl phenol ethoxylates, and bisphenol A. The treatment fluid may not comprise aromatic solvents, toluene, xylene, aromatic petroleum naphtha, light aromatic petroleum naphtha, branched dibasic ethers, linear dibasic ethers, dimethyl 2-methylglutarate, trimethyl citrate, turpentine, terpenes, ethyl lactate, d-limonene, dipentene, citrus, orange, caster oil ethoxylates, 9-decenoate methyl ester, propylene glycol propyl ether, propylene glycol butyl ether, N-methyl-pyrrolidone, N-octyl-2-pyrrolidinone, 1-dodecyl-2-pyrrolidinone, N,N-dimethyl-9-decenamide, acetic ester of monoglycerides, diethyl carbonate, hydrocarbon distillates (C7-C28), or any combinations thereof. The emulsified well fluid may have a property selected from the group consisting of asphaltene content greater than 3%, naphthenic acid content greater than 3%, API gravity less than 36, total acid number greater than 0.5, and any combination thereof. The concentration of the resin alkoxylated oligomer may be in a range of about 0.002% (v/v) to about 80% (v/v) of the treatment fluid. The concentration of the polyol may be in a range of about 0.002% (v/v) to about 80% (v/v) of the treatment fluid. The concentration of the polyamine polyether may be in a range of about 0.002% (v/v) to about 80% (v/v) of the treatment fluid. The emulsified well fluid may be separated into the aqueous phase and the oleaginous phase after contact with the treatment fluid for ten minutes or less.

Provided are systems for demulsifying an emulsified well fluid in accordance with the disclosure and the illustrated FIGs. An example system comprises a treatment fluid comprising an aqueous base fluid; an alcohol; a resin alkoxylated oligomer; a polyol; and a polyamine polyether. The system further comprises mixing equipment configured to mix the aqueous base fluid; the alcohol; the resin alkoxylated oligomer; the polyol; and the polyamine polyether to provide the treatment fluid. The system further comprises pumping equipment configured to pump the treatment fluid. The system further comprises a separator configured to separate the emulsified well fluid into its aqueous and oleaginous phases.

Additionally or alternatively, the system may include one or more of the following features individually or in combination. The system may be configured to contact the emulsified well fluid with the treatment fluid prior to emulsified well fluid entering the separator. The emulsified well fluid may be a production fluid disposed within production tubing; wherein the system is configured to contact the emulsified well fluid with the treatment fluid in the production tubing. The resin alkoxylated oligomer may comprise a resin alkoxylated oligomer selected from the group consisting of phenol formaldehyde ethoxylates, alkoxylated alkyl phenol formaldehyde resins, epoxy resin alkoxylates, poly diepoxide ethoxylates, phenolic resins, methyloxirane polymers, phenol formaldehyde polymers with methyloxirane, phenol formaldehyde oxiranes, butyl resins, and any combinations thereof. The polyol may be selected from the group consisting of polyoxyalkylene glycol, a polyol block copolymer, and any combinations thereof. The polyamine polyether may be selected from the group consisting of amine oxyalkylates, alkoxylated polyamines, amine-initiated polyol block copolymers, ethylenediamine ethoxylated polyethyleneimine polymers, ethylenediamine propoxylated polyethyleneimine polymers, and any combination thereof. The treatment fluid may not comprise at least one of nonylphenol ethoxylates, alkyl phenol ethoxylates, and bisphenol A. The treatment fluid may not comprise aromatic solvents, toluene, xylene, aromatic petroleum naphtha, light aromatic petroleum naphtha, branched dibasic ethers, linear dibasic ethers, dimethyl 2-methylglutarate, trimethyl citrate, turpentine, terpenes, ethyl lactate, d-limonene, dipentene, citrus, orange, caster oil ethoxylates, 9-decenoate methyl ester, propylene glycol propyl ether, propylene glycol butyl ether, N-methyl-pyrrolidone, N-octyl-2-pyrrolidinone, 1-dodecyl-2-pyrrolidinone, N,N-dimethyl-9-decenamide, acetic ester of monoglycerides, diethyl carbonate, hydrocarbon distillates (C7-C28), or any combinations thereof. The emulsified well fluid may have a property selected from the group consisting of asphaltene content greater than 3%, naphthenic acid content greater than 3%, API gravity less than 36, total acid number greater than 0.5, and any combination thereof. The concentration of the resin alkoxylated oligomer may be in a range of about 0.002% (v/v) to about 80% (v/v) of the treatment fluid. The concentration of the polyol may be in a range of about 0.002% (v/v) to about 80% (v/v) of the treatment fluid. The concentration of the polyamine polyether may be in a range of about 0.002% (v/v) to about 80% (v/v) of the treatment fluid. The emulsified well fluid may be separated into the aqueous phase and the oleaginous phase after contact with the treatment fluid for ten minutes or less.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of" or "consist of the various components and steps." Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for demulsifying an emulsified well fluid, the method comprising:
    contacting the emulsified well fluid with a treatment fluid comprising:
        an aqueous base fluid;
        an alcohol;
        a resin alkoxylated oligomer;
        a polyol selected from the group consisting of polyoxyalkylene glycol, a polyol block copolymer, and any combinations thereof; and
        a polyamine polyether selected from the group consisting of amine oxyalkylates, alkoxylated polyamines, amine-initiated polyol block copolymers, ethylenediamine ethoxylated polyethyleneimine polymers, ethylenediamine propoxylated polyethyleneimine polymers, and any combination thereof;
    wherein the emulsified well fluid is separated into an aqueous phase and an oleaginous phase after contact with the treatment fluid; wherein the emulsified well fluid is separated into the aqueous phase and the oleaginous phase after contact with the treatment fluid for ten minutes or less.

2. The method of claim 1, wherein the resin alkoxylated oligomer comprises a resin alkoxylated oligomer selected from the group consisting of phenol formaldehyde ethoxylates, alkoxylated alkyl phenol formaldehyde resins, epoxy resin alkoxylates, poly diepoxide ethoxylates, phenolic resins, methyloxirane polymers, phenol formaldehyde polymers with methyloxirane, phenol formaldehyde oxiranes, butyl resins, and any combinations thereof.

3. The method of claim 1, wherein the treatment fluid does not comprise nonylphenol ethoxylates, alkyl phenol ethoxylates, or bisphenol A.

4. The method of claim 1, wherein the treatment fluid does not comprise aromatic solvents, toluene, xylene, aromatic petroleum naphtha, light aromatic petroleum naphtha, branched dibasic ethers, linear dibasic ethers, dimethyl 2-methylglutarate, trimethyl citrate, turpentine, terpenes, ethyl lactate, d-limonene, dipentene, citrus, orange, caster oil ethoxylates, 9-decenoate methyl ester, propylene glycol propyl ether, propylene glycol butyl ether, N-methyl-pyrrolidone, N-octyl-2-pyrrolidinone, 1-dodecyl-2-pyrrolidinone, N,N-dimethyl-9-decenamide, acetic ester of monoglycerides, diethyl carbonate, hydrocarbon distillates (C7-C28), or any combinations thereof.

5. The method of claim 1, wherein the emulsified well fluid has a property selected from the group consisting of asphaltene content greater than 3%, naphthenic acid content greater than 3%, API gravity less than 36, total acid number greater than 0.5, and any combination thereof.

6. The method of claim 1, wherein the concentration of the resin alkoxylated oligomer is in a range of about 0.002% (v/v) to about 80% (v/v) of the treatment fluid.

7. The method of claim 1, wherein the concentration of the polyol is in a range of about 0.002% (v/v) to about 80% (v/v) of the treatment fluid.

8. The method of claim 1, wherein the concentration of the polyamine polyether is in a range of about 0.002% (v/v) to about 80% (v/v) of the treatment fluid.

9. A treatment fluid for demulsifying an emulsified well fluid, the treatment fluid comprising:
    an aqueous base fluid;
    an alcohol;
    a resin alkoxylated oligomer;
    a polyol selected from the group consisting of polyoxyalkylene glycol, a polyol block copolymer, and any combinations thereof; and
    a polyamine polyether selected from the group consisting of amine oxyalkylates, alkoxylated polyamines, amine-initiated polyol block copolymers, ethylenediamine ethoxylated polyethyleneimine polymers, ethylenediamine propoxylated polyethyleneimine polymers, and any combination thereof;
    wherein the treatment fluid is configured to separate the emulsified well fluid into an aqueous phase and an oleaginous phase after contact with the treatment fluid for ten minutes or less.

10. The treatment fluid of claim 9, wherein the resin alkoxylated oligomer comprises a resin alkoxylated oligomer selected from the group consisting of phenol formaldehyde ethoxylates, alkoxylated alkyl phenol formaldehyde resins, epoxy resin alkoxylates, poly diepoxide ethoxylates, phenolic resins, methyloxirane polymers, phenol formaldehyde polymers with methyloxirane, phenol formaldehyde oxiranes, butyl resins, and any combinations thereof.

11. The treatment fluid of claim 9, wherein the treatment fluid does not comprise nonylphenol ethoxylates, alkyl phenol ethoxylates, or bisphenol A.

12. The treatment fluid of claim 9, wherein the treatment fluid does not comprise aromatic solvents, toluene, xylene, aromatic petroleum naphtha, light aromatic petroleum naphtha, branched dibasic ethers, linear dibasic ethers, dimethyl 2-methylglutarate, trimethyl citrate, turpentine, terpenes, ethyl lactate, d-limonene, dipentene, citrus, orange, caster oil ethoxylates, 9-decenoate methyl ester, propylene glycol propyl ether, propylene glycol butyl ether, N-methyl-pyrrolidone, N-octyl-2-pyrrolidinone, 1-dodecyl-2-pyrrolidinone, N,N-dimethyl-9-decenamide, acetic ester of monoglycerides, diethyl carbonate, hydrocarbon distillates (C7-C28), or any combinations thereof.

13. The treatment fluid of claim 9, wherein the emulsified well fluid has a property selected from the group consisting of asphaltene content greater than 3%, naphthenic acid content greater than 3%, API gravity less than 36, total acid number greater than 0.5, and any combination thereof.

14. The treatment fluid of claim 9, wherein the concentration of the resin alkoxylated oligomer is in a range of about 0.002% (v/v) to about 80% (v/v) of the treatment fluid.

15. The treatment fluid of claim 9, wherein the concentration of the polyol is in a range of about 0.002% (v/v) to about 80% (v/v) of the treatment fluid.

16. The fluid of claim 9, wherein the concentration of the polyamine polyether is in a range of about 0.002% (v/v) to about 80% (v/v) of the treatment fluid.

17. A system for demulsifying an emulsified well fluid, the system comprising:
 a treatment fluid comprising:
  an aqueous base fluid;
  an alcohol;
  a resin alkoxylated oligomer;
  a polyol selected from the group consisting of polyoxyalkylene glycol, a polyol block copolymer, and any combinations thereof; and
  a polyamine polyether selected from the group consisting of amine oxyalkylates, alkoxylated polyamines, amine-initiated polyol block copolymers, ethylenediamine ethoxylated polyethyleneimine polymers, ethylenediamine propoxylated polyethyleneimine polymers, and any combination thereof;
  when the treatment fluid is configured to separate the emulsified well fluid into an aqueous phase and an oleaginous phase after contact with the treatment fluid for ten minutes or less;
 mixing equipment configured to mix the aqueous base fluid; the alcohol; the resin alkoxylated oligomer; the polyol; and the polyamine polyether to provide the treatment fluid;
 pumping equipment configured to pump the treatment fluid; and
 a separator configured to separate the emulsified well fluid into its aqueous and oleaginous phases.

18. The system of claim 17, wherein the system is configured to contact the emulsified well fluid with the treatment fluid prior to emulsified well fluid entering the separator.

19. The system of claim 17, wherein the emulsified well fluid is a production fluid disposed within production tubing; wherein the system is configured to contact the emulsified well fluid with the treatment fluid in the production tubing.

20. The system of claim 17, wherein the emulsified well fluid has a property selected from the group consisting of asphaltene content greater than 3%, naphthenic acid content greater than 3%, API gravity less than 36, total acid number greater than 0.5, and any combination thereof.

\* \* \* \* \*